(12) United States Patent
Egan et al.

(10) Patent No.: US 6,485,601 B1
(45) Date of Patent: Nov. 26, 2002

(54) WATER BASED CONSTRUCTION ADHESIVE HAVING IMPROVED MOISTURE RESISTANCE USEFUL FOR BINDING TWO SUBSTRATES

(75) Inventors: Luke S. Egan, Rockhill, SC (US); Michael J. Drewery, Charlotte, NC (US); Donald R. Cavalier, Charlotte, NC (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/157,482

(22) Filed: Sep. 21, 1998

Related U.S. Application Data

(63) Continuation-in-part of application No. 08/910,646, filed on Aug. 13, 1997, now abandoned.
(51) Int. Cl.$^7$ .............................................. C09J 101/00
(52) U.S. Cl. ................... 156/331.8; 156/332; 524/813; 524/832; 526/302
(58) Field of Search .............................. 156/332, 331.8; 524/832, 813; 526/302

(56) References Cited

U.S. PATENT DOCUMENTS

| | | | | | |
|---|---|---|---|---|---|
| 2,694,695 A | * | 11/1954 | Bortnick | ...................... | 526/302 |
| 3,100,760 A | * | 8/1963 | Brown et al. | ................ | 156/332 |
| 4,925,908 A | * | 5/1990 | Bernard et al. | ............. | 524/832 |
| 5,045,616 A | * | 9/1991 | Rauterkus et al. | .......... | 526/302 |
| 5,118,749 A | | 6/1992 | Knutson | | |
| 5,202,375 A | | 4/1993 | Biale | | |
| 5,534,310 A | | 7/1996 | Rokowski | | |
| 5,908,908 A | * | 6/1999 | Vanhoye et al. | ............ | 526/302 |

FOREIGN PATENT DOCUMENTS

| | | | | |
|---|---|---|---|---|
| JP | 61-254678 | * 11/1986 | .................. | 156/332 |

* cited by examiner

*Primary Examiner*—John J. Gallagher

(57) ABSTRACT

The present invention relates to an environmentally safe water based construction adhesive suitable for binding two (2) substrates together under conditions wherein moisture resistance is a requirement.

24 Claims, No Drawings

WATER BASED CONSTRUCTION ADHESIVE HAVING IMPROVED MOISTURE RESISTANCE USEFUL FOR BINDING TWO SUBSTRATES

This application is a Continuation in Part of U.S. patent application, Ser. No. 08/910,646, filed Aug. 13, 1997, which is now abandoned.

FIELD OF THE INVENTION

The present invention relates to an environmentally safe, moisture resistant, water based construction adhesive and to a method for binding two substrates together using said construction adhesive.

BACKGROUND OF THE INVENTION

The construction industry relies heavily on high performance adhesives to bind structural components together such as plywood and lumber, gypsum and wood, and styrofoam and wood. High performance construction adhesives are often based on urethane and solvent containing systems. These systems have several problems associated with them. Specifically, the solvent based systems are not environmentally friendly and the urethane based systems contain isocyanate wherein toxicology issues may arise. However, solvent based and urethane based systems provide the superior moisture resistance necessary to prevent construction surfaces from coming apart under severe weather conditions.

The art has attempted to replace the solvent based systems with more environmentally friendly adhesives. Specifically, U.S. Pat. No. 5,534,310 (Rohm and Haas) discloses a latex binder suitable for producing a durable adherent coating comprising (1) an aqueous evaporable carrier having dispersed therein and (2) a latex polymer prepared by mixing, for example, butyl acrylate, methyl methacrylate, ureidomethacrylate, acrylamide, and acrylic acid, chain transfer agent and ammonium carbonate. Said latex polymer has an acid number of 1 to 70 and a low molecular weight in the range of 10,000 to 10 200,000 g/mole. U.S. Pat. No. 5,202,375 (Rohm and Haas) discloses a water resistant polymeric emulsion containing a surfactant (nonionic or anionic) blended with acrylic acid, butyl acrylate, methylmethacrylate and ureidomethacrylate and a cross-linking monomer. U.S. Pat. No. 5,118,749 (Union Oil of California) discloses an acrylic emulsion useful in preparing paints containing acrylic acid, methymethacrylate, butyl acrylate, acrylamide and ureidomethacrylate and a chain transfer agent.

The Applicant's invention relates to an aqueous based construction adhesive which exhibits moisture resistance performance matching or exceeding conventional solvent and urethane based systems.

SUMMARY

Accordingly the present invention relates to a method for adhering 2 substrates together using a composition including (c) 10 to 95% soft acrylic ester monomers;
(b) 0 to 70% hard monomers;
(c) 0 to 5% of one or more ureido containing monomers;
(c) 0 to 5% vinyl based monomers; and
(e) 0 to 10% polymerizable functional acids All percentages are weight percent unless otherwise indicated.

DETAILED DESCRIPTION

The present invention is a method for adhering 2 substrates together with a composition comprising 10 to 95% soft acrylic monomers;
0 to 70 percent hard monomers;
0 to 5% of ureido containing polymerizable monomers;
0 to 5% vinyl based monomers; and
0 to 10% polymerizable functional acids.

Preparation of the Construction Adhesive Formulation For Use in the Method of the Present Invention The construction adhesive formulation of the present invention is prepared by blending elements (a)–(e) (i.e. the monomers) in a polymerization reactor with catalysts and surfactants, according to methods known to those skilled in the art to form a polymeric emulsion. The general emulsion polymerization processes include, but are not limited to, those described in U.S. Pat. Nos. 5,202,375, 5,534,310 and 5,118,749, incorporated by reference herein, are suitable for preparing the polymeric emulsion useful in the practice of the present invention. Said polymeric emulsion is then blended with processings aids, known to those skilled in the art, such as dispersants, defoamers, tackifiers, freeze/thaw inhibitors, fillers and thickeners to formulate the finished adhesive product useful in adhering 2 substrates together.

Polymer emulsions (also referred to as polymer dispersion) may be prepared with single phase, core-shell or other core/surface modified or phase-separated morphologies using a wide range of various monomer feed strategies, particle creation strategies, initiator levels and feed strategy, chain transfer agent levels and feed strategies, polymerization temperature and temperature profiles, ingredient feed times, and final polymerization conversion as well as various final particle size and size distributions, and various polymer molecular weights, surfactant or other additive contents, solvent insoluble gel contents, solids contents, pH's and viscosities. Polymer dispersions prepared by continuous monomer pre-emulsion feed in the absence of chain transfer agent and crosslinking monomer are preferred.

The final polymeric emulsion should have a total volatile organic compound (VOC) level, excluding water, not to exceed 1 to 2 weight percent.

The polymeric emulsion, useful in the practice of the present invention, is prepared by the emulsion polymerization of soft acrylic ester monomers, hard monomers, ureido containing polymerizable monomers, vinyl monomers, and polymerizable functional acids with catalyst and surfactants according to methods described in U.S. Pat. Nos. 5,202,375, 5,534,310 and 5,118,749, incorporated by reference herein.

(a) Soft Acrylic Ester Monomers

One or more soft acrylic ester monomers are added at a level of 10 to 95%; preferably 20 to 60%; more preferably 45 to 55% by weight to reactor. Soft acrylic monomers useful in the practice of the present invention include, but are not limited to, butyl acrylate, isobutyl acrylate, 2-ethylhexyl acrylate, isodecyl methacrylate, lauryl methacrylate, tridecylmethacrylate. Butyl acrylate is preferred.

Further, non-functional acrylic ester monomers can be added. Exemplary non-functional acrylic ester monomers have the formula

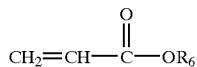

wherein $R_6$ is an alkyl group that preferably contains up to about 6 carbon atoms.

(b) Hard Monomers

One or more hard monomers are added at a level of 0 to 70%; preferably 20 to 60%; more preferably 45 to 55% by weight to the reactor. Hard monomers useful in the practice of the present invention include, but are not limited to, alkylene aromatic monomers and non-functional methacrylic monomers.

Alkylene aromatic monomers include, but are not limited to, styrene, p-methyl styrene, methyl styrene, p-chlorostyrene, isopropyl styrene, t-butyl styrene and o-methyl-p-isopropyl styrene.

With respect to non-functional methacrylic monomers, exemplary non-functional methacrylic monomers have the formula

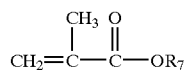

wherein $R_7$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof. Methyl methacrylate is preferred.

(c) Ureido Containing Monomers

One or more ureido containing monomers are added at a level of 0 to 5%; preferably 1 to 4%; more preferably 2 to 3% by weight to the reactor. Ureido containing monomers useful in the practice of the present invention, include, but are not limited to, 2-ureido-ethyl acrylate, 2-ureido-methyl acrylate, 2-ureido-ethyl acrylamide, 2-ureido-ethyl methacrylamide, and 1-[2-(3-alloxy-2-hydroxypropylamino)ethyl]imidazolidin-2-one. The preferred ureido-containing monomer is 2-ureido-methyl-acrylate (UMA).

(d) Vinyl Monomers

One or more vinyl monomers are added at a level of 0 to 5%; preferably 1 to 4%; and more preferably 2 to 3% by weight to the reactor. Vinyl monomers useful in the practice of the present invention include, but are not limited to, acrylamide; acrylonitrile; 1,2-butadiene; 1,3-butadiene; chloroprene; 1,3,5-hexatriene; vinyl acetate; vinyl chloride; vinyl toluene; vinyl versatate; vinylidene chloride; or combinations thereof. Acrylamide is preferred.

(e) Functional Acids

One or more functional acids are added at a level of 0 to 10%; preferably 1 to 8%; more preferably 2 to 3% by weight to the reactor. Functional acids useful in the practice of the present invention include, but are not limited to acrylic acid; methacrylic acid; alpha-haloacrylic acids such as chloroacrylic acid; itaconic acid; maleic acid; and fumaric acid. Acrylic acid is preferred.

The aforementioned elements (a)–(e) are reacted with catalysts and chain transfer-agents.

Catalysts (also known as initiators) useful in preparing the polymeric emulsion useful in the practice of the present invention include, but are not limited to, certain water-soluble initiators, various azo compounds, and select redox combinations.

Suitable water-soluble initiators include but are not limited to peracetic acid; certain persulfates, such as sodium, potassium, ammonium, and barium persulfate; acetyl peroxide; hydrogen peroxide; hydroperoxides such) as tertiarybutyl hydroperoxide; or combinations thereof. A presently preferred water-soluble free-radical initiator is ammonium persulfate.

Suitable azo initiators include but are not limited to azodiisobutyl nitrile; azobisdimethyl valeronitrile; azodiisobutyl amide; azobis(alphaethylbutyl nitrile); azobis (alpha, gamma-dimethyl-capronitrile); or combinations thereof.

One redox combination, suitable for purposes of the present invention, may include a water-soluble persulfate as the oxidizing component of the redox combination, and a hydrosulfite, e.g. sodium hydrosulfite, as the reducing component of the redox combination. Further in accordance with principles of the present invention, water-soluble bisulfites, metabisulfites, thiosulfates, or formaldehyde sulfoxylates, may be used in lieu of the hydrosulfites.

Said catalysts are used at levels of 0.5–1%, preferably 0.05–5%.

Chain transfer agents are optional. However, if desired they may be added. Suitable chain transfer agents include, but are not limited to, the chain transfer agents selected from aliphatic mercaptans having from 1 to about 4. carbon atoms; aliphatic halides, preferably chlorides, having 1 to about 3 carbon atoms; aliphatic alcohols having 1 hydroxyl group and from 1 to about 6 carbon atoms; and aliphatic alcohols having 2 or more hydroxyl groups and 2 to about 10 carbon atoms or more. Specific examples of these include, but are not limited to, methyl mercaptan, ethyl mercaptan, n-propyl mercaptan, isopropyl mercaptan, n-butyl mercaptan, tert-dodecyl mercaptan, sec-butyl mercaptan, t-butyl mercaptan, and butyl-1,4-dimercaptan; carbon tetrachloride, chloroform, trichlorobromomethane, chloroethane, fluoroethane, chlorofluoroethane, and trichlorethylene; methanol, ethanol, ethylene glycol, 1-propanol, 1,3-propanediol, glycerol, vinylglycol, 1,4-butanediol, but-1-en-3-ol, 1-pentanol, 2-pentanol, t-amyl alcohol, 1,2,3-hexanetriol, 1,2,5-hexanetriol, and 1,10-decanediol. Also useful are aliphatic mercaptans having carboxylic acid functionality, such as thioglycolic acid (mercaptoacetic acid), thiodiglycolic acid, and thiomalic acid (mercaptosuccinic acid); and aliphatic sulfides, such as diallyl sulfide, diethenyl sulfide, and diethyl sulfide.

Preferred chain transfer agents have both sulfur functionality active for chain transfer and oxygen functionality capable of participating in hydrogen-bonding interactions. Said chain transfer agents are used at levels of 0–10%, preferably 0.2–2%.

Finally, processing aids are blended with the finished polymeric emulsion, to formulate the adhesive useful in the practice of the present invention. Said processing aids, include but are not limited to:

1. Dispersants

Dispersants are added at a level of 0 to 2%; preferably 0.1 to 0.5%; and more preferably 0.1 to 0.2% by weight. Said dispersants include, but are not limited to, sodium tripolyphosphate, and low molecular weight polyacrylic acid based polymers. The preferred dispersant is sodium tripolyphosphate and PIGMENT DISPERSER® N (polyacrylic acid polymer).

2. Defoamers

Defoamers are added at a level of 0 to 0.5%, preferably 0.05 to 0.2%, more preferably 0.05 to 0.1% by weight. Said defoamers include, but are not limited to hydrocarbon and silicon dioxide based raw materials or blends thereof. The preferred defoamer is NOPCO® NXZ available from Henkel.

3. Tackifiers

The Tackifiers are added at a level of 0.1 to 60%; preferably 1 to 40%; more preferably 2 to 10% by weight. Said tackifiers include, but are not limited to rosin ester emulsions, rosin and/or hydrocarbon resin emulsions. The preferred tackifier is SNOWTACK 301A™.

4. Freeze/thaw Inhibitors

The freeze/thaw inhibitors are added at a level of 0 to 20%; preferably 1 to 10%: more preferably 2 to 5% by weight. Said freeze/thaw inhibitors include, but are not limited to propylene glycol, urea, and ethanol. The most preferred freeze/thaw inhibitor is propylene glycol.

5. Fillers

The fillers are added at a level of 0 to 80%; preferably 10 to 50%; more preferably 30 to 40% by weight. Said fillers include, but are not limited to clay, calcium carbonate, talc and silica dioxide. The most preferred fillers are a blend of calcium carbonate and clay.

6. Thickeners

The thickeners are added at a level of 0 to 5%; preferably 0.1 to 1%: more preferably 0.2 to 0.5% by weight. Said thickeners include, but are not limited to polyacrylic acid based thickeners, attapulgite clays, and associative thickeners. The most preferred thickeners are polyacrylic acid based materials.

The final construction adhesive product should have a volatile organic content (VOC), excluding water, not to exceed 1 to 2 weight percent.

The construction adhesives useful in the practice of the present invention has the following characteristics:

|  | Preferred | More Preferred | Most Preferred |
|---|---|---|---|
| pH | 2 to 13 | 6 to 11 | 7 to 9 |
| solids content % | 20 to 90 | 50 to 80 | 65 to 75 |
| viscosity (cps) | 5,000 to 1,000,000 | 50,000 to 5,000,000 | 100,000 to 200,000 |
| % latex binder in formula | 10 to 90 | 30 to 70 | 40 to 60 |

THE UTILITY OF THE PRESENT INVENTION

The present invention is useful for binding two substrates, including but not limited to: cement to cement; cement to styrofoam; aluminum to foam; steel to wood; galvanized steel to foam; luaun to foam (under layment base for floor); Plywood to foam; gypsum to foam; gypsum/lumber, Tarpaper to foam; oriented strand board (OSB) to tarpaper; OSB to foam; OSB to plywood; and plywood to lumber and any of the above with cement board or any other underlayment (pine, particle board, asponite, structure wood, fiber board) or any other substrate used in the construction industry. Plywood/lumber are the preferred substrates.

A representative, but not limiting, construction adhesive useful in binding the aforementioned substrates is prepared accordingly:

A polymer emulsion is prepared:
  a. 49 parts n-butyl acrylate
  b. 51 parts methylmethacrylate
  c. 1.9 parts ureidomethacrylate—CAS number 86261-90-7
  d. 1.7 parts acrylamide
  e. 1 part acrylic acid
  f. 100 parts water; and
  g. 5 parts auxiliaries (including surfactant and initiator and chain transfer agents, if desired) are reacted according to methods known to those skilled in the art.

Then, 56% by weight of the polymer emulsion described hereinabove is blended with:
  a. 0.2% dispersants such as sodium tripolyphosphate™
  b. 0.05% defoamers such as Nopco NXZ™
  c. 3.6% tackifiers such as Snowtack 301A™
  d. 3.0% freeze/thaw inhibitors such as ethylene glycol™
  e. 34.1% fillers such as clay and Duramite™
  f. 0.2% thickeners such as Acrysol ASE 60™
  g. 2.3% coalescent such as Eastman DBA™

The construction adhesive is now ready for use in the present invention.

The construction adhesive useful in the practice of the present invention should have the following characteristics for optional performance.

|  | Preferred | More Preferred | Most Preferred |
|---|---|---|---|
| pH | 2 to 13 | 6 to 11 | 7 to 9 |
| solids content % | 20 to 90 | 50 to 80 | 65 to 75 |
| viscosity (cps) | 5,000 to 1,000,000 | 50,000 to 500,000 | 100,000 to 200,000 |
| % latex binder in formula (dry/dry) | 10 to 90 | 30 to 70 | 40 to 60 |

The pH can be adjusted by adding ammonia or other caustic solutions (sodium hydroxide or potassium hydroxide)

Viscosity is measured by a Brookfield® Viscometer.

We claim:

1. A method for adhering two substrates together comprising the step of applying to at least one substrate, a construction adhesive comprising a polymer made by emulsion polymerizing a mixture of monomers consisting essentially of:

(a) 20 to 60%, based on the total weight of monomers, soft acrylic ester monomers (b) 20 to 60%, based on the total weight of monomer, hard monomers c) 1 to 4%, based on tie total weight of monomers, ureido containing polymerizable monomers (d) 1 to 4%, based on the total weight of monomers, vinyl base monomers (e) 1 to 8%, based on the total weight of monomer, polymerize functional acids, and compounds selected from the group consisting of catalyst, chain transfer agents, and optionally, compounds selected from the group consisting of dispersants, defoamers, tackifiers, freeze-thaw inibitors, fillers, thickeners and mixtures thereof, to form a water-based adhesive having a water-based adhesive having a viscosity of between 5,000 and 1,000,000 cps, and subsequent to application of the adhesive, contacting the two substrates for bonding.

2. A method according to claim 1, wherein said two substrates to be adhered are plywood and lumber.

3. The method of claim 1 wherein the soft acrylic ester monomers are selected from the group consisting of:

monomers of the formula:

wherein
  $R_6$ is an alkyl group having up to 6 carbon atoms;
  2-ethylhexyl acrylate;
  isodecyl acrylate lauryl methacrylate;
tridecyl methacralte; and
combinations thereof.

4. The method of claim 3 wherein the soft acrylic ester monomers include butyl acrylate.

5. The method of claim 3 wherein the soft acrylic monomers comprise 20–60% of said composition.

6. The method of claim 3 wherein the soft acrylic monomers comprise 45–55% of said composition.

7. The method of claim 1 wherein the hard monomers are selected from the group consisting of:
monomers of the formula:

$$CH_2=CH(CH_3)-CO_2-R_7,$$

wherein
$R_7$ is an alkyl group containing up to 6 carbon atoms;
styrene;
p-methyl styrene;
isopropyl styrene;
t-butyl styrene;
o-methyl-p-chlorostyrene; and
combinations thereof.

8. The method of claim 3 wherein the hard monomers are selected from the group consisting of monomers of the formula:

$$CH_2=CH(CH)_3-R_7,$$

wherein $R_7$ is an alkyl group containing up to 6 carbon atoms, and mixtures thereof;
and from monomers selected from the group consisting of styrene, p-methyl styrene, isopropyl styrene, t-butyl styrene, o-methyl-p-chlorostyrene, and combinations thereof.

9. The method of claim 7 wherein the hard monomers comprise 20–60% of the composition.

10. The method of claim 9 wherein the hard monomers include methyl methylacrylate.

11. The method of claim 1 wherein the ureido containing polymerizable monomers are selected from the group consisting of:
2-ureido-ethyl acrylate;
2-ureido-methyl acrylate;
2-ureido-ethyl acrylamide;
2-ureido-ethyl methacrylamide;
1-{2-(3-alloxy-2-hydroxypropylamino)ethyl]imidazolin-2-one; and
combinations thereof.

12. The method of claim 7 wherein the ureido containing polymerizable monomers are selected from the group consisting of:
2-ureido-ethyl acrylate;
2-ureido-methyl acrylate;
2-ureido-ethyl acrylamide;
2-ureido-ethyl methacrylamide;
1-{2-(3-alloxy-2-hydroxypropylamino)ethly]imidazolin-2-one; and
combinations thereof.

13. The method of claim 11, wherein the ureido containing polymerizable monomers comprise 2–3% of the composition.

14. The method of claim 12 wherein the ureido containing monomers include 2-ureido-methyl-acrylate.

15. The method of claim 1 wherein the vinyl base monomers are selected from the group consisting of:
acrylamide;
acrylonitrile;
1,2-butadiene;
1,3-butadiene;
chloroprene;
1,3,5-hexatriene;
vinyl acetate;
vinyl chloride;
vinyl toluene;
vinyl versatate;
vinylidene chloride; and
combinations thereof.

16. The method of claim 12 wherein the vinyl base monomers are selected from the group consisting of:
acrylamide;
acrylonitrile;
1,2-butadiene;
1,3-butadiene;
chloroprene;
1,3,5-hexatriene;
vinyl acetate;
vinyl chloride;
vinyl toluene;
vinyl versatate;
vinylidene chloride; and
combinations thereof.

17. The method of claim 15 wherein the vinyl monomers comprise 2–3% of the composition.

18. The method of claim 15 wherein the vinyl monomers include acrylamide.

19. The method of claim 1 wherein the polymerizable functional acids are selected from the group consisting of: acrylic acid; methacrylic acid; alpha-haloacrylic acids; itaconic acid; maleic acid; fumaric acid and combinations thereof.

20. The method of claim 12 wherein the polymerizable functional acids are selected from the group consisting of: acrylic acid; methacrylic acid; alpha-haloacrylic acids; itaconic acid; maleic acid; fumaric acid and combinations thereof.

21. The method of claim 19 wherein the polymerizable functional acids comprise 2–3% of the composition.

22. The method of claim 1 wherein the vinyl monomers include acrylic acid.

23. The method of claim 1 wherein the polymer is formed from a monomer mixture comprising:
about 49 parts n-buty acrylate;
about 51 parts methymethacrylate;
about 1.9 parts 2-ureidomethyl acrylate
about 1.7 parts acrylamide; and
about 1 part acrylic acid.

24. The method of claim 1 wherein the composition has a total VOC level not exceeding 2%.

* * * * *